(12) United States Patent
Keld et al.

(10) Patent No.: US 10,733,582 B2
(45) Date of Patent: Aug. 4, 2020

(54) INTERACTIVE ACCOUNT MANAGEMENT SYSTEM AND METHOD

(71) Applicant: JPMorgan Chase Bank, N.A., New York, NY (US)

(72) Inventors: Marcia Keld, Middletown, DE (US); Manning Field, Media, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 811 days.

(21) Appl. No.: 15/211,296

(22) Filed: Jul. 15, 2016

(65) Prior Publication Data
US 2016/0328687 A1     Nov. 10, 2016

Related U.S. Application Data

(63) Continuation of application No. 14/197,539, filed on Mar. 5, 2014, now Pat. No. 9,424,609, which is a
(Continued)

(51) Int. Cl.
*G06Q 20/10* (2012.01)
*G06Q 10/10* (2012.01)
(Continued)

(52) U.S. Cl.
CPC ......... *G06Q 20/102* (2013.01); *G06F 3/0482* (2013.01); *G06Q 10/10* (2013.01);
(Continued)

(58) Field of Classification Search
CPC ........ G06Q 30/00; G06Q 40/00; G06Q 20/20; G06Q 20/02; G06Q 40/06; G06Q 40/02; G06Q 10/00
(Continued)

(56) References Cited

U.S. PATENT DOCUMENTS 4,375,032 A    2/1983  Uchida et al.
4,423,313 A   12/1983  Tanigaki et al.
(Continued)

OTHER PUBLICATIONS

"Purchasing Cards: A Debit/Credit Card that Tracks Spending by On-the-Road Employees All those small purchases can be tough to keep straight. A new card from Comdata helps." Financial Services Marketing Apr. 3, 2000; Banking Information Source, ProQuest. Web. Mar. 24, 2001.

(Continued)

*Primary Examiner* — Olusegun Goyea
(74) *Attorney, Agent, or Firm* — Greenblum & Bernstein, P.L.C.

(57) ABSTRACT

Embodiments of the invention are directed to a computer-implemented interactive account management system operated in cooperation with a financial institution on behalf of multiple account holders. The interactive account management system may include a financial networking engine implemented by a processor for defining a financial network for each account holder and for identifying each member of an account holder financial network based on stored account information and account holder input. The system may additionally include interactive processing components for processing information to provide collaborative interaction between the members of the account holder financial network defined by the financial networking engine and user interface presentation tools for displaying financial guidance and collaborative interaction interfaces and inviting active participation from the financial network members.

10 Claims, 14 Drawing Sheets

Related U.S. Application Data continuation of application No. 13/959,045, filed on Aug. 5, 2013, now Pat. No. 8,706,579, which is a continuation of application No. 13/658,993, filed on Oct. 24, 2012, now Pat. No. 8,566,187, which is a continuation of application No. 13/430,030, filed on Mar. 26, 2012, now Pat. No. 8,321,310, which is a continuation of application No. 12/388,801, filed on Feb. 19, 2009, now Pat. No. 8,160,941, which is a continuation-in-part of application No. 11/952,457, filed on Dec. 7, 2007, now Pat. No. 7,949,579.

(51) Int. Cl.

| | |
|---|---|
| *G06Q 20/02* | (2012.01) |
| *G06Q 20/14* | (2012.01) |
| *G06Q 20/20* | (2012.01) |
| *G06Q 20/22* | (2012.01) |
| *G06Q 40/00* | (2012.01) |
| *G06Q 40/02* | (2012.01) |
| *G06Q 40/04* | (2012.01) |
| *G06Q 40/06* | (2012.01) |
| *G06F 3/0482* | (2013.01) |
| *G06F 16/28* | (2019.01) |
| *H04L 29/06* | (2006.01) |

(52) U.S. Cl.
CPC ............ *G06Q 20/02* (2013.01); *G06Q 20/10* (2013.01); *G06Q 20/14* (2013.01); *G06Q 20/20* (2013.01); *G06Q 20/227* (2013.01); *G06Q 40/00* (2013.01); *G06Q 40/02* (2013.01); *G06Q 40/04* (2013.01); *G06Q 40/06* (2013.01); *G06Q 40/10* (2013.01); *G06Q 40/12* (2013.12); *G06F 16/284* (2019.01); *H04L 29/06* (2013.01)

(58) Field of Classification Search
USPC ................. 705/35, 38, 40, 39, 16, 37, 36 R
See application file for complete search history.

(56) References Cited

U.S. PATENT DOCUMENTS

| | | | |
|---|---|---|---|
| 4,587,379 A | 5/1986 | Masuda et al. | |
| 4,594,663 A | 6/1986 | Nagata et al. | |
| 4,713,761 A | 12/1987 | Sharpe et al. | |
| RE32,985 E | 7/1989 | Nagata et al. | |
| 4,914,587 A * | 4/1990 | Clouse ................... | G06Q 20/40 235/379 |
| 5,220,501 A | 6/1993 | Lawlor et al. | |
| 5,514,220 A | 5/1996 | Wetmore | |
| 5,604,802 A | 2/1997 | Holloway et al. | |
| 5,787,175 A * | 7/1998 | Carter ................. | G06F 21/6209 707/999.008 |
| 5,809,483 A | 9/1998 | Broka et al. | |
| 5,819,263 A * | 10/1998 | Bromley ................ | G06Q 10/10 |
| 5,903,881 A | 5/1999 | Schrader et al. | |
| 5,918,217 A * | 6/1999 | Maggioncalda ... | G06Q 30/0601 705/36 R |
| 6,006,205 A | 12/1999 | Loeb et al. | |
| 6,039,245 A | 3/2000 | Symonds et al. | |
| 6,078,891 A | 6/2000 | Riordan et al. | |
| 6,195,091 B1 * | 2/2001 | Harple .................. | G06Q 10/10 348/E7.084 |
| 6,282,523 B1 * | 8/2001 | Tedesco ................ | G06Q 20/04 235/379 |
| 6,334,116 B1 | 12/2001 | Ganesan et al. | |
| 6,360,209 B1 | 3/2002 | Loeb et al. | |
| 6,519,572 B1 | 2/2003 | Riordan et al. | |
| 6,556,724 B1 * | 4/2003 | Chang ................... | G06F 3/1454 345/1.2 |
| 6,587,870 B2 * | 7/2003 | Takagi ................... | G06Q 10/10 348/E7.084 |
| 6,606,606 B2 | 8/2003 | Starr | |
| 6,609,113 B1 | 8/2003 | O'Leary et al. | |
| 6,859,212 B2 | 2/2005 | Kumar et al. | |
| 6,880,079 B2 | 4/2005 | Kefford et al. | |
| 6,980,983 B2 * | 12/2005 | Banerjee ................ | G06Q 10/00 |
| 7,409,392 B2 | 8/2008 | Greer et al. | |
| 7,437,330 B1 | 10/2008 | Robinson et al. | |
| 7,475,346 B1 * | 1/2009 | Bullock ................ | G06F 16/958 709/203 |
| 7,631,323 B1 * | 12/2009 | Green ................ | G06Q 30/0601 235/383 |
| 7,680,708 B1 | 3/2010 | Mooney et al. | |
| 7,783,545 B2 * | 8/2010 | Sloan ..................... | G06Q 40/00 705/35 |
| 7,788,153 B1 * | 8/2010 | White .................... | G06Q 20/10 705/35 |
| 7,818,233 B1 * | 10/2010 | Sloan ..................... | G06Q 20/10 705/35 |
| 7,831,468 B1 * | 11/2010 | Conte .................... | G06Q 30/02 705/14.1 |
| 7,886,003 B2 | 2/2011 | Newnam et al. | |
| 7,890,405 B1 * | 2/2011 | Robb ........................ | G06F 9/54 705/35 |
| 8,145,573 B2 | 3/2012 | Hill | |
| 8,777,947 B2 | 7/2014 | Zahrly et al. | |
| 2001/0029470 A1 | 10/2001 | Schultz et al. | |
| 2001/0029483 A1 | 10/2001 | Schultz et al. | |
| 2001/0029484 A1 | 10/2001 | Schultz et al. | |
| 2001/0032183 A1 | 10/2001 | Landry | |
| 2001/0044762 A1 | 11/2001 | Nault | |
| 2002/0077966 A1 | 6/2002 | Harycki et al. | |
| 2002/0087410 A1 * | 7/2002 | Walker .................... | G06Q 30/02 705/14.36 |
| 2002/0089532 A1 | 7/2002 | Cohen et al. | |
| 2002/0099648 A1 | 7/2002 | DeVoe et al. | |
| 2002/0116210 A1 * | 8/2002 | Medina .................. | G06Q 10/06 705/301 |
| 2002/0123949 A1 * | 9/2002 | VanLeeuwen ......... | G06Q 40/00 705/35 |
| 2002/0124188 A1 * | 9/2002 | Sherman ................ | G06Q 10/10 726/6 |
| 2002/0138389 A1 * | 9/2002 | Martone ................ | G06Q 10/10 705/36 R |
| 2002/0138447 A1 * | 9/2002 | Dutta .................... | G06Q 20/108 705/70 |
| 2002/0188559 A1 | 12/2002 | Schultz | |
| 2002/0198806 A1 * | 12/2002 | Blagg ..................... | G06Q 40/00 705/35 |
| 2003/0009402 A1 * | 1/2003 | Mullen .................. | G06Q 20/04 705/35 |
| 2003/0023492 A1 | 1/2003 | Riordan et al. | |
| 2003/0023594 A1 | 1/2003 | Ramamurthi | |
| 2003/0074305 A1 * | 4/2003 | Gallon .................. | G06Q 20/04 705/37 |
| 2003/0083933 A1 * | 5/2003 | McAlear ................ | G06Q 30/02 705/14.17 |
| 2003/0088460 A1 | 5/2003 | Riordan et al. | |
| 2003/0101131 A1 * | 5/2003 | Warren ................. | G06Q 20/10 705/38 |
| 2003/0191711 A1 | 10/2003 | Jamison et al. | |
| 2003/0200173 A1 | 10/2003 | Chang | |
| 2003/0204460 A1 * | 10/2003 | Robinson ............... | G06Q 20/02 705/35 |
| 2004/0015366 A1 | 1/2004 | Wiseman et al. | |
| 2004/0019553 A1 | 1/2004 | Setz et al. | |
| 2004/0030657 A1 * | 2/2004 | Holm-Blagg .......... | G06Q 20/04 705/65 |
| 2004/0039691 A1 * | 2/2004 | Barratt .................. | G06Q 20/04 705/39 |
| 2004/0080527 A1 | 4/2004 | Elliott | |
| 2004/0111329 A1 * | 6/2004 | Moore ................... | G06Q 30/06 705/26.1 |
| 2004/0117361 A1 | 6/2004 | Greer et al. | |
| 2005/0004860 A1 * | 1/2005 | Pretell ................... | G06Q 40/02 705/38 |

(56) References Cited

U.S. PATENT DOCUMENTS

| | | | |
|---|---|---|---|
| 2005/0010483 A1* | 1/2005 | Ling | G06Q 20/10 705/39 |
| 2005/0027632 A1* | 2/2005 | Zeitoun | G06Q 40/06 705/36 R |
| 2005/0097033 A1* | 5/2005 | Pretell | G06Q 40/02 705/38 |
| 2005/0131792 A1 | 6/2005 | Rowe | |
| 2005/0149437 A1* | 7/2005 | Zellner | G06Q 20/10 705/39 |
| 2005/0154662 A1* | 7/2005 | Langenwalter | G06Q 40/00 705/35 |
| 2005/0171881 A1 | 8/2005 | Ghassemieh et al. | |
| 2006/0020530 A1* | 1/2006 | Hsu | G06Q 40/00 705/35 |
| 2006/0095374 A1* | 5/2006 | Lo | G06Q 20/108 705/42 |
| 2006/0106703 A1* | 5/2006 | Del Rey | G06Q 40/00 705/35 |
| 2006/0143214 A1* | 6/2006 | Teicher | G06F 16/9535 |
| 2006/0151598 A1* | 7/2006 | Chen | G06Q 20/20 235/380 |
| 2006/0167834 A1* | 7/2006 | Rubel, Jr. | G06Q 10/107 |
| 2006/0249574 A1* | 11/2006 | Brown | G06K 19/06187 235/380 |
| 2007/0022051 A1* | 1/2007 | Regan | G06Q 20/102 705/40 |
| 2007/0073562 A1 | 3/2007 | Brice et al. | |
| 2007/0156392 A1 | 7/2007 | Balchandran et al. | |
| 2007/0192242 A1* | 8/2007 | Kunz | G06O 40/02 705/38 |
| 2007/0198407 A1* | 8/2007 | Winter | G06Q 20/102 705/40 |
| 2007/0244777 A1* | 10/2007 | Torre | G06Q 40/00 705/35 |
| 2007/0250336 A1* | 10/2007 | Khoury | G06Q 30/02 705/319 |
| 2008/0010173 A1* | 1/2008 | Rendich | G06Q 10/02 705/28 |
| 2008/0021787 A1* | 1/2008 | Mackouse | G06Q 20/10 705/17 |
| 2008/0071601 A1* | 3/2008 | Cihla | G06Q 30/02 705/35 |
| 2008/0071640 A1* | 3/2008 | Nguyen | G06Q 20/387 705/14.27 |
| 2008/0091761 A1* | 4/2008 | Tsao | G06F 9/526 709/201 |
| 2008/0097806 A1* | 4/2008 | Hoover | G06Q 10/0631 705/7.12 |
| 2008/0097957 A1* | 4/2008 | Hoover | G06Q 10/10 |
| 2008/0140837 A1* | 6/2008 | Hoover | G06F 21/6218 709/225 |
| 2008/0201248 A1* | 8/2008 | Wellons | G06Q 20/102 705/35 |
| 2008/0215615 A1* | 9/2008 | Hoover | G06Q 10/10 |
| 2008/0228615 A1* | 9/2008 | Scipioni | G06Q 20/04 705/35 |
| 2008/0228637 A1* | 9/2008 | Scipioni | G06Q 20/04 705/39 |
| 2008/0228638 A1* | 9/2008 | Scipioni | G06Q 20/10 705/39 |
| 2008/0235101 A1* | 9/2008 | Piepenbrink | G06Q 20/20 705/16 |
| 2008/0235278 A1* | 9/2008 | Piepenbrink | G06Q 30/02 705/14.69 |
| 2008/0245854 A1* | 10/2008 | Monden | G06Q 40/02 235/379 |
| 2008/0250333 A1* | 10/2008 | Reeves | G06F 3/0483 715/753 |
| 2008/0275758 A1* | 11/2008 | Clayton | G06Q 10/06375 705/7.31 |
| 2008/0301153 A1 | 12/2008 | Greer et al. | |
| 2009/0018956 A1* | 1/2009 | Picciallo | G06Q 20/04 705/39 |
| 2009/0048957 A1* | 2/2009 | Celano | G06Q 40/00 705/35 |
| 2009/0055224 A1* | 2/2009 | Kashyap | G06Q 50/22 705/4 |
| 2009/0106141 A1* | 4/2009 | Becker | G06Q 40/025 705/38 |
| 2009/0106158 A1* | 4/2009 | Hill | G06Q 20/04 705/66 |
| 2009/0112763 A1* | 4/2009 | Scipioni | G06Q 20/04 705/41 |
| 2009/0119205 A1* | 5/2009 | Keresman, III | G06Q 20/04 705/39 |
| 2009/0204496 A1* | 8/2009 | Otto | G06N 5/025 705/14.69 |
| 2009/0204526 A1* | 8/2009 | Wellons | G06Q 40/00 705/35 |
| 2009/0204529 A1* | 8/2009 | Warsaw | G06Q 30/04 705/35 |
| 2009/0287995 A1* | 11/2009 | Tsao | H04L 67/06 715/234 |
| 2009/0292591 A1 | 11/2009 | Schultz et al. | |
| 2009/0319929 A1 | 12/2009 | Wang et al. | |
| 2010/0005006 A1* | 1/2010 | Green | G06Q 30/0601 705/26.1 |
| 2010/0036946 A1 | 2/2010 | Von Arx | |
| 2010/0057574 A1 | 3/2010 | Banerjee et al. | |
| 2010/0083217 A1 | 4/2010 | Dalai et al. | |
| 2010/0094774 A1 | 4/2010 | Jackowitz et al. | |
| 2010/0100424 A1 | 4/2010 | Buchanan et al. | |
| 2010/0100469 A1 | 4/2010 | Buchanan et al. | |
| 2010/0100470 A1 | 4/2010 | Buchanan et al. | |
| 2010/0114763 A1 | 5/2010 | Rosenberger | |
| 2010/0121778 A1* | 5/2010 | Castineiras | G06Q 20/10 705/36 R |
| 2010/0145737 A1* | 6/2010 | Joao | G06Q 20/10 705/4 |
| 2010/0174606 A1 | 7/2010 | Hoyle | |
| 2010/0268656 A1* | 10/2010 | Teicher | G06F 16/9535 705/319 |
| 2010/0325043 A1 | 12/2010 | Buchanan et al. | |
| 2011/0087985 A1 | 4/2011 | Buchanan et al. | |
| 2011/0107265 A1 | 5/2011 | Buchanan et al. | |
| 2011/0137823 A1* | 6/2011 | Robb | G06F 9/54 705/36 R |
| 2011/0179078 A1 | 7/2011 | Boerries et al. | |
| 2012/0005082 A1 | 1/2012 | Pitroda et al. | |
| 2012/0057686 A1 | 3/2012 | Bingaman et al. | |

OTHER PUBLICATIONS

Brooker, Dena. "Purchasing cards: the next generation." Modern Purchasing Jun. 1, 1997: Research library, ProQuest. Web Mar. 24, 2011.

Klaus, Hintz. "Put it on my card, please." CMA Apr. 1, 1998: AB/INFORM Global, ProQuest. Web. Mar. 24, 2011.

"Compunetix Releases New Data Collaboration Application; CONTEX Presenter™ 3000 is the most intuitive and integrated in the industry." PR Newswire Aug. 25, 2006 Business Dateline, ProQuest Web Dec. 1, 2011.

"Novell Meets Needs of Small Companies for Network Growth, "PR Newswire Mar. 31, 1999 Business Dateline, ProQuest, Web Dec. 1, 2011.

\* cited by examiner

FIG. 7

← ▼ → ▼ ✉ Reply ✉ Reply All ⛳ Flag 🖨 Print 🗑 Delete

From    Nora <nora@home.com>
Date    Saturday, March 23, 2013 3:45pm
To      Nick <nick@home.com>
Cc
Subject An invitation from Nora — 1030

— 1010
— 1020

From: Nora van Bergen — 1040
Hi honey. Link up!

I have a Chase Flexible Rewards Card and I want to add you as a member of my financial network so we can selectively share information like our goals, rewards, and credit scores. But first, you need to sign up for a Chase card yourself.

Choose from an extensive list of cards offering great rates and superior service. We're sure you'll find one with the purchasing power you need. Regardless of the card you choose, you'll also enjoy the benefits of a robust statement experience that can help you confidently make borrowing decisions—both big and small.

 — 1050

| Credit score 1310 | Goals 1320 | Financial network 1330 |
|---|---|---|
| ▼ | ▼ | ▼ |
| Me | 1 New house | All 1332 ▼ |
| 1312 720 | 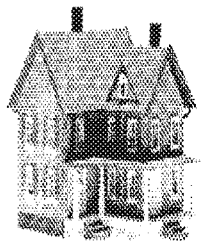 1322 | 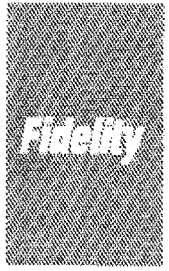  |
| Nick | 2 Thailand | 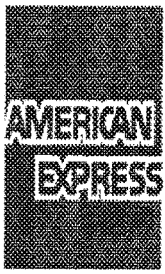  |
| 1314 690 | 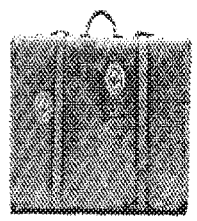 1324 | 1334 |
| 1316 Improve | 1326 | |
1300
FIG 13

INTERACTIVE ACCOUNT MANAGEMENT SYSTEM AND METHOD

CROSS-REFERENCE OF RELATED APPLICATIONS

This application is a continuation of patent application Ser. No. 14/197,539, filed Mar. 5, 2014, which is a continuation of patent application Ser. No. 13/959,045, filed on Aug. 5, 2013, which is a continuation of patent application Ser. No. 13/658,993, now U.S. Pat. No. 8,566,187, filed on Oct. 24, 2012, which is a continuation of patent application Ser. No. 13/430,030, now U.S. Pat. No. 8,321,310, filed on Mar. 26, 2012, which is a continuation of application Ser. No. 12/388,801, now U.S. Pat. No. 8,160,941, filed on Feb. 19, 2009, which is a continuation-in-part of application Ser. No. 11/952,457, now U.S. Pat. No. 7,949,579, filed on Dec. 7, 2007, all of which are fully incorporated herein by reference. This application also claims priority to commonly owned U.S. patent application Ser. No. 12/388,730, filed on Feb. 19, 2009, which is also incorporated herein by reference.

TECHNICAL FIELD

Embodiments of the invention are related generally to systems and methods for improving an interactive customer financial account experience within a customer financial network and in particular to improving customer accessibility to financial account information to facilitate achievement of financial goals.

BACKGROUND OF THE INVENTION

In recent years, consumers have drastically reduced the use of cash payment for goods and services and have more frequently relied on credit cards, debit cards, stored value cards, or electronic transfer of funds associated with a financial account to facilitate financial transactions. Due to the electronic nature of payment, financial institutions are able to track consumer behaviors involved in these transactions.

Financial institutions frequently provide multiple types of products, such as credit cards, debit cards, mortgages, brokerage accounts, and other types of accounts and may offer a number of different options related to the management of each account. Typically, account holders are informed of these options upon opening an account or through special offers that may be made periodically.

Many accounts can be accessed by more than one account holder. For example, multiple account holders may be authorized for use of a single checking account or a credit card account. Multiple account holders may have access both to personal credit accounts and small business credit accounts. Furthermore, mortgages are often held by two customers. In some instances, such as with a credit card account, a main account holder may have control over the account and other account holders may merely have access to the account. Generally, the multiple persons having an association with related accounts may be viewed as forming a financial network.

In existing financial systems, co-account holders are generally provided with the same interface and do not have the ability to interact with one another or to jointly and interactively plan to meet financial goals. Furthermore, any available financial planning tools fail to consider the actions and plans of co-account holders.

Given the increased availability of electronic resources, such as financial institution web sites that are available to account holders over the Internet, it is now possible to provide account holders with a real time display of account activity as well as available account options. Although financial institutions have increased the availability of resources to account holders, these resources remain uniform without regard for individual account holder behaviors, relationships, and preferences.

Accordingly, a solution is needed that leverages data available to financial institutions for each account holder in order to provide valuable up-to-date information about accounts and financial relationships to each account holder in an efficient manner. Furthermore, a solution is needed that provides a main account holder with leverage to control access by other account holders in a systematic manner.

SUMMARY OF THE INVENTION

In one aspect of the invention, a computer-implemented interactive account management system is operated in cooperation with a financial institution on behalf of multiple account holders. The interactive account management system includes a financial networking engine implemented by a processor for defining a financial network for each account holder and for identifying each member of an account holder financial network based on stored account information and account holder input, wherein members of the account holder financial network include the account holder and at least one of a co-account holder, a family member, and a financial advisor. The system additionally includes interactive processing components for processing information to provide collaborative interaction between the members of the account holder financial network defined by the financial networking engine, the collaborative interaction including financial guidance for the account holder and the co-account holder and goal-related review between account holders. The system additionally includes user interface presentation tools for displaying financial guidance and collaborative interaction interfaces and inviting active participation from the financial network members as determined by the financial networking components, the user interface presentation tools accepting input from the financial network members and correspondingly displaying output as determined by the interactive processing components.

In an additional aspect of the invention, a computer-implemented interactive account management method is operated in cooperation with a financial institution on behalf of multiple account holders. The interactive account management method includes defining a financial network for each account holder and identifying each member of an account holder financial network based on stored account information and account holder input. Members of the account holder financial network include the account holder and at least one of a co-account holder and a financial advisor. The method additionally includes processing stored and input information with interactive processing components to provide collaborative interaction between the members of the defined account holder financial network. The collaborative interaction includes financial guidance for the account holder and the co-account holder and goal-related review between account holders. The method additionally includes displaying financial guidance and collaborative interaction interfaces, thereby inviting active participation and accepting input from the financial network members and correspondingly displaying output as determined by the interactive processing components.

In yet a further aspect of the invention, a computer-implemented interactive account management system is operated in cooperation with a financial institution on behalf of multiple account holders. The interactive account management system comprises at least one computing system including a processor implementing stored instructions to perform multiple steps. The steps include defining a financial network for each account holder and identifying each member of an account holder financial network based on stored account information and account holder input, wherein members of the account holder financial network include the account holder and at least one of a co-account holder and a financial advisor. The steps further include processing stored and input information with interactive processing components to provide collaborative interaction between the members of the defined account holder financial network, the collaborative interaction including financial guidance for the account holder and the co-account holder and goal-related review between account holders. The steps additionally include displaying financial guidance and collaborative interaction interfaces, thereby inviting active participation from the financial network members, and accepting input from the financial network members and correspondingly displaying output as determined by the interactive processing components.

BRIEF DESCRIPTION OF THE DRAWINGS

The present invention is described in detail below with reference to the attached drawings figures, wherein:

FIG. 7 illustrates a user interface providing permission settings to an account holder in accordance with an embodiment of the invention;

FIG. 10 illustrates a user interface for financial networking in accordance with an embodiment of the invention;

FIG. 11 illustrates a comparative purchasing scenario interface in accordance with an embodiment of the invention;

FIG. 13 illustrates a relationship link user interface in accordance with an embodiment of the invention.

DETAILED DESCRIPTION OF PREFERRED EMBODIMENTS

Embodiments of the present invention are directed to a method and system for providing interactive financial guidance that enables an account holder to interact with co-account holders or family members, a credit card issuing company, a financial advisor, or other relevant entities to make financial decisions and share financial information. The method and system have particular application for financial accounts, such as credit card accounts, mortgage accounts, checking accounts, and other types of financial accounts.

Figure 1:
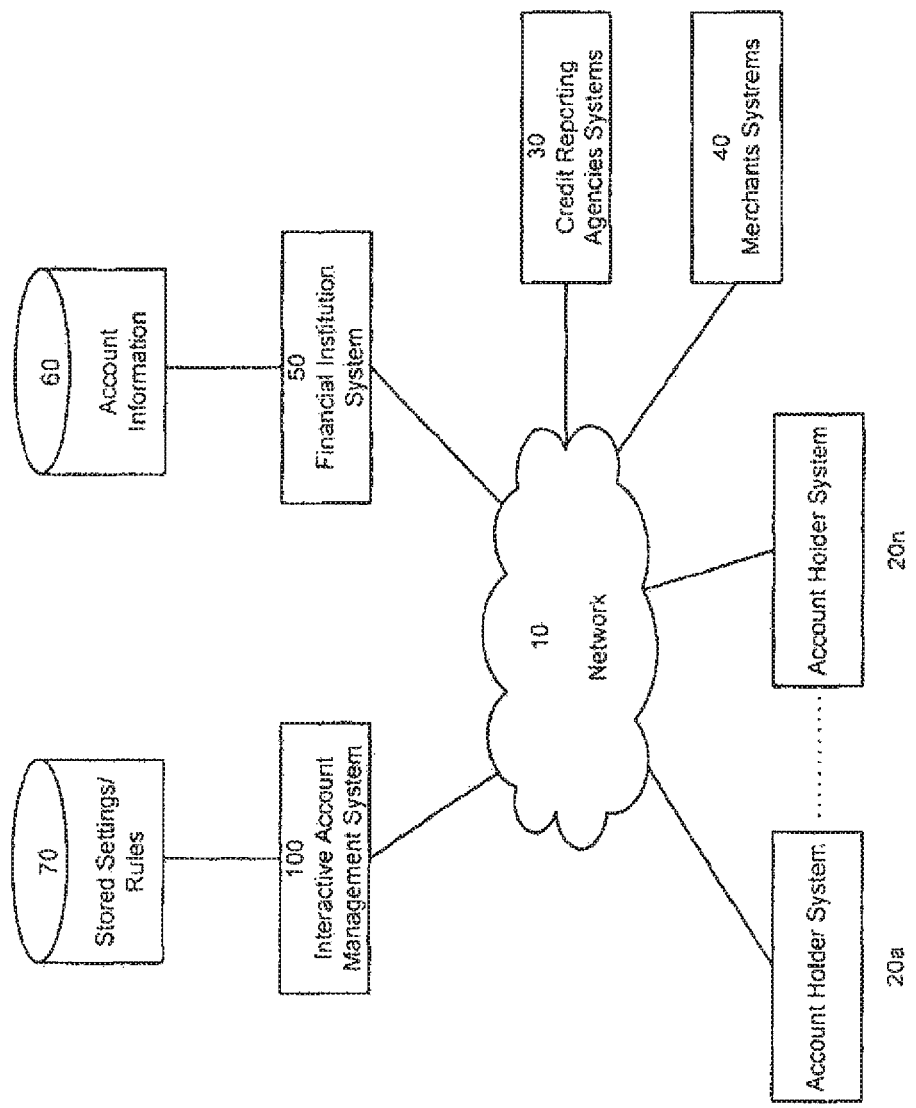
FIG. 1 is a block diagram illustrating an operating environment for an interactive account management system in accordance with an embodiment of the invention.

FIG. 1 is a block diagram illustrating an operating environment for an interactive account management system 100 in accordance with an embodiment of the invention;

The environment illustrates multiple entities connected over a network 10. In addition to the interactive account management system 100, the entities may include a financial institution system 50, credit reporting agency systems 30, merchant systems 40, and account holder systems 20a . . . 20n. The interactive account management system 100 may access a database 70 and the financial institution system 50 may access a database 60.

As illustrated, the interactive account management system 100 may access a database 70 and may store data in and retrieve data from the database 70. The database 70 may include data, stored account settings, stored rules, and other information. In embodiments of the invention, the accounts managed by the interactive account management system 100 may be associated with a card, such as a credit card, a debit card, a stored value card, or other type of card. Alternatively or additionally, the managed accounts may be mortgage accounts, checking accounts, or other types of accounts. The interactive account management system 100 manages not only accounts, but relationships between individual account holders as will be further discussed below.

One or more card issuers or financial institution systems 50 may also be connected with the interactive account management system 100 over the network 10. While the interactive account management system 100 may operate in cooperation with a single financial institution 50, it may also operate in cooperation with multiple financial institutions 50. The financial institutions 50 may access account information 60 that may be stored for each account holder at the financial institution 50.

Account holder systems 20a . . . 20n may be connected over the network 10 with the interactive account management system 100. Additionally, merchants 40 and credit reporting agencies 30 may be connected with one another over the network 10.

Although illustrated as separate systems, in embodiments of the invention, the interactive account management system 100 and the card issuer or financial institution system 50 may be integrated so as to form a unitary system.

The network 10 may for example include the Internet. Although the various systems are shown as connected over one network, they may instead be connected over multiple networks.

The financial institution system 50 typically provides the account holder systems 20a . . . 20n with account information when requested. In the illustrated environment, the financial institution system 50 may cooperate with the interactive account management system 100 in order to provide the account information. The financial institution system 50 typically also provides monthly or other periodic statements to the account holder systems 20a . . . 20n, provides payment information to merchants 40, and receives payment requests from merchants 40.

The financial institution system 50 and interactive account management system 100 may further receive information over the network 10 from credit reporting agencies 30. This information may be used to provide advice and guidance to account holder systems 20a . . . 20n as will be further explained below.

Merchant systems 40 may include online shopping systems accessible via the network 10 or another network. The merchant systems 40 may further be connected to POS devices in retail environments. In the illustrated environment, the interactive account management system 100 is capable of collecting information from and distributing information to merchant systems 40.

All of the aforementioned systems are computing systems with processing components and are connected over the network. The computing systems may be any of the known types of computing systems as will be further described below.

Figure 2:
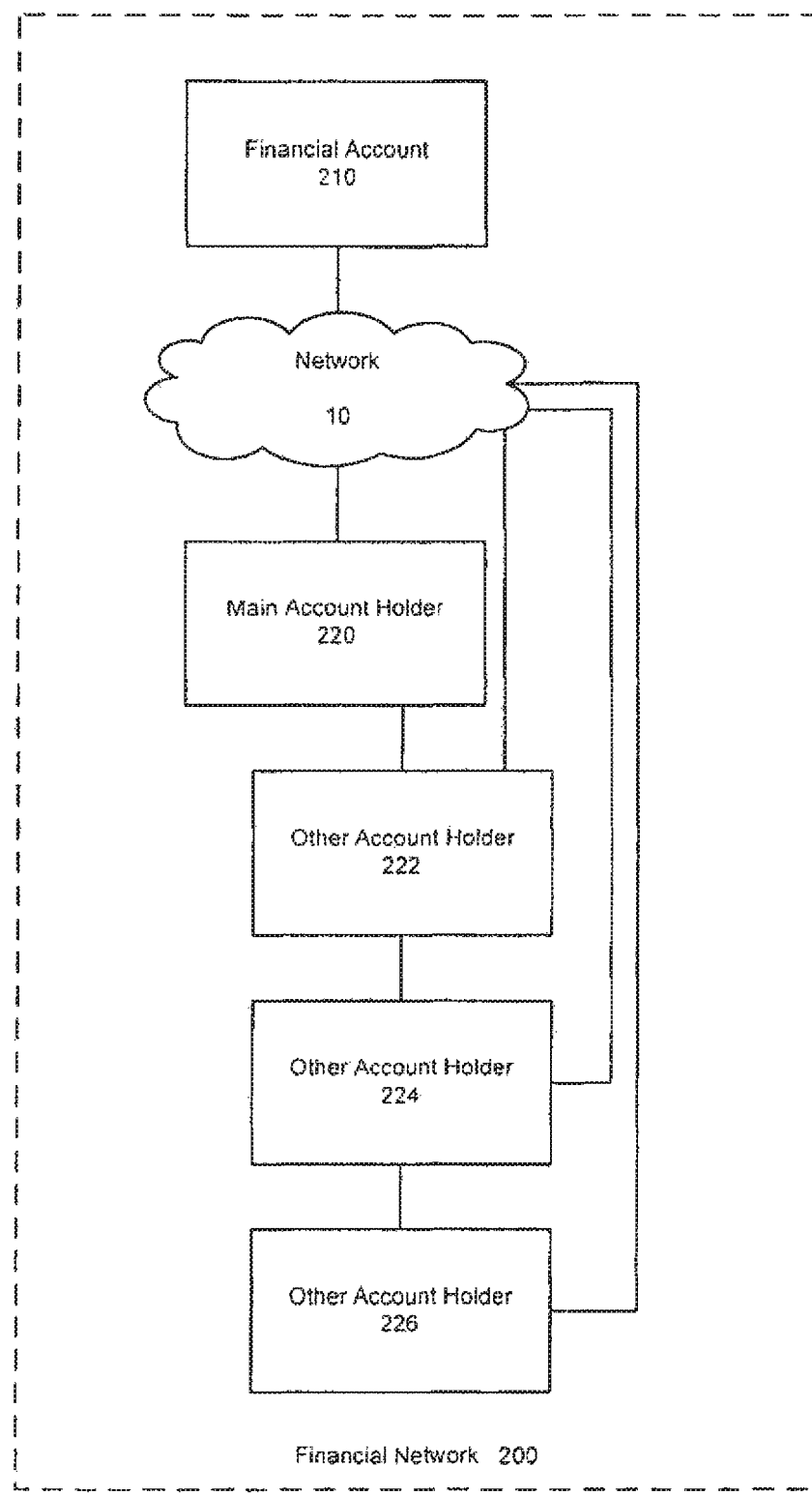
FIG. 2 is a block diagram illustrating an exemplary financial network in accordance with an embodiment of the invention.

FIG. 2 is a block diagram illustrating an exemplary financial network 200 in accordance with an embodiment of the invention. A main account holder 220 may establish a financial account 210 and may communicate with the entity sponsoring the financial account 210 over the network 10. Other account holders 222, 224, and 226 may also have access to the financial account 210, but the access may be limited. In embodiments of the invention, the access is limited by the main account holder 220.

Figure 3:
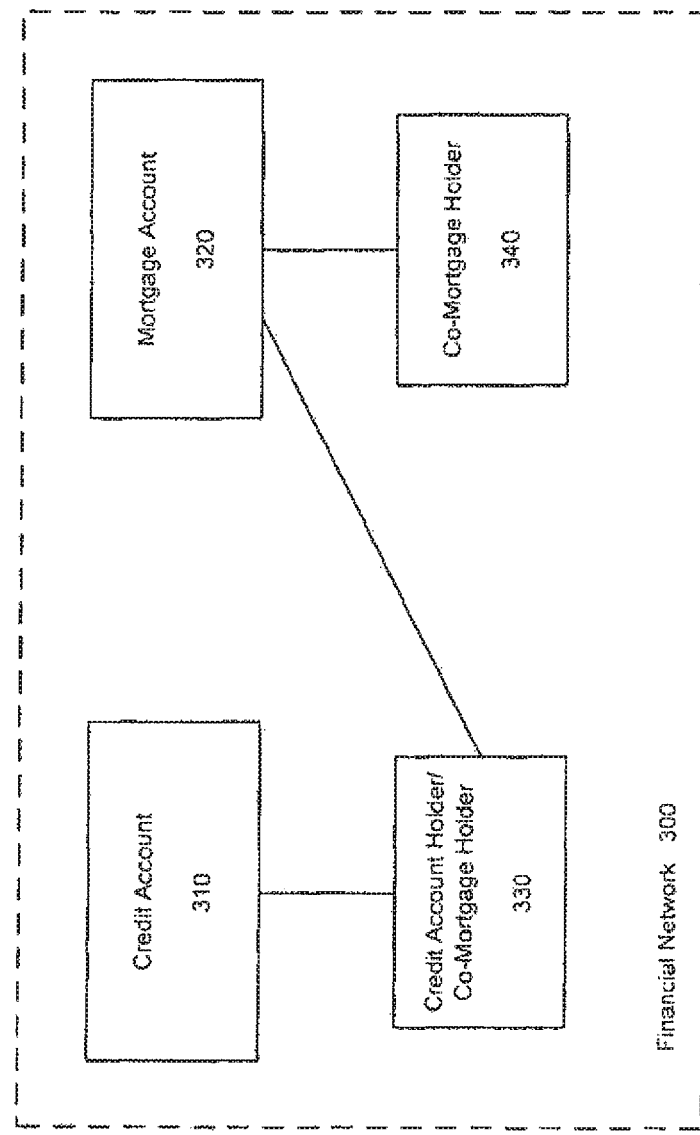
FIG. 3 is a block diagram illustrating another exemplary financial network in accordance with an embodiment of the invention.

FIG. 3 is a block diagram illustrating another exemplary financial network 300 in accordance with an embodiment of the invention. A credit account holder/co-mortgage holder 330 accesses both a credit account 310 and a mortgage account 320. A co-mortgage holder 340 accesses the mortgage account 340.

Figure 4:
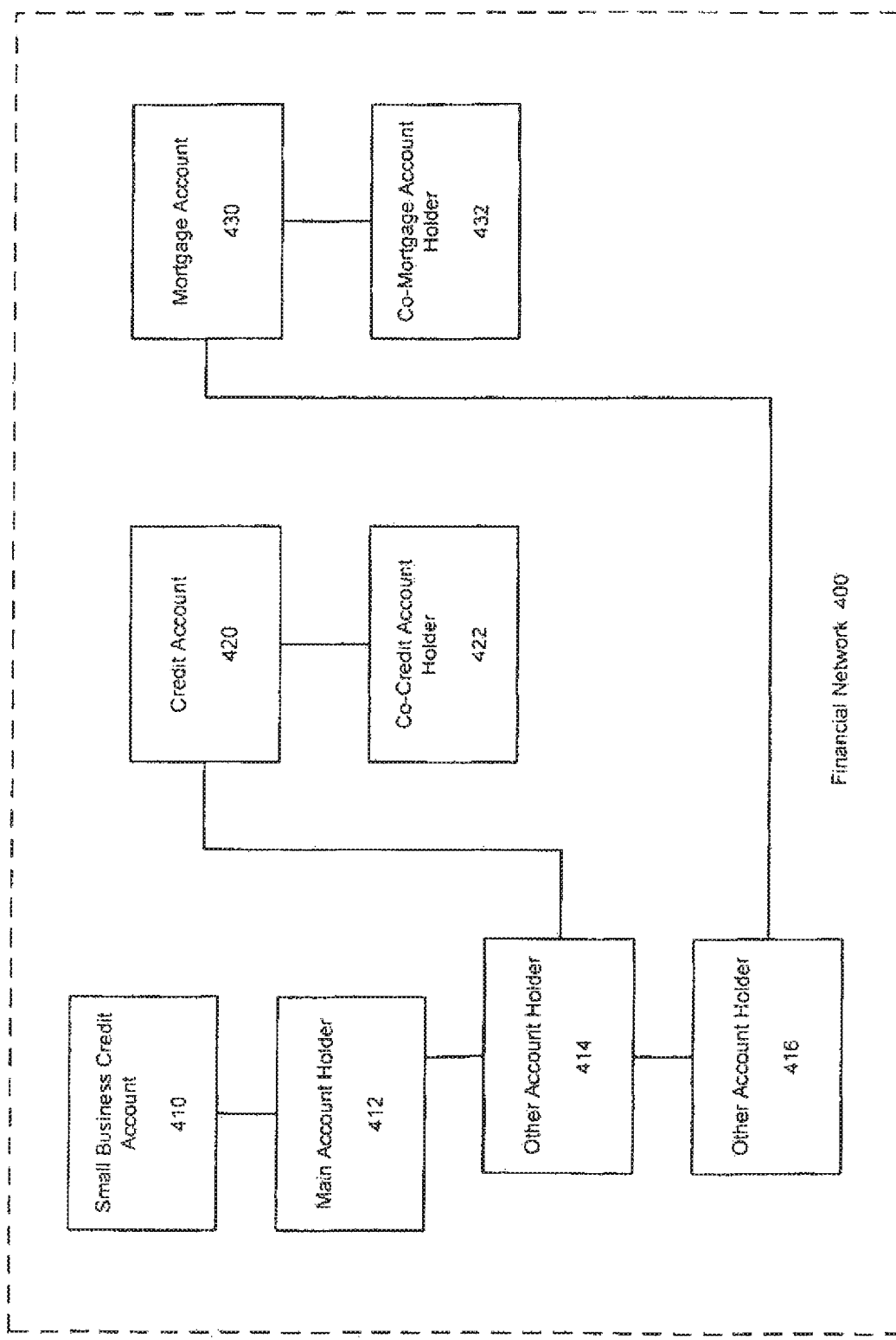
FIG. 4 is a block diagram illustrating another exemplary financial network in accordance with an embodiment of the invention.

FIG. 4 is a block diagram illustrating another exemplary financial network 400 in accordance with an embodiment of the invention. A main account holder 412 may access a small business credit account 410. Other account holders 414 and 416 may also access the small business credit account 410. One of the other account holders 414 may also access a credit account 420 in conjunction with a co-credit account holder 422. Account holder 416 may access a mortgage account 430 in conjunction with co-mortgage account holder 432. The diagram is simplified to delete various components. However, in embodiments of the invention, the account holders illustrated access the accounts over a network such as the network 10 described above in conjunction with FIG. 1.

The embodiments illustrated in FIGS. 2, 3, and 4 should be viewed as merely exemplary. Financial networks in accordance with embodiments of the invention may be defined by individual account holders to include any other person the account holder chooses to include. In embodiments of the invention, permissions and membership are reciprocal and thus are mutually agreed upon.

Figure 5:
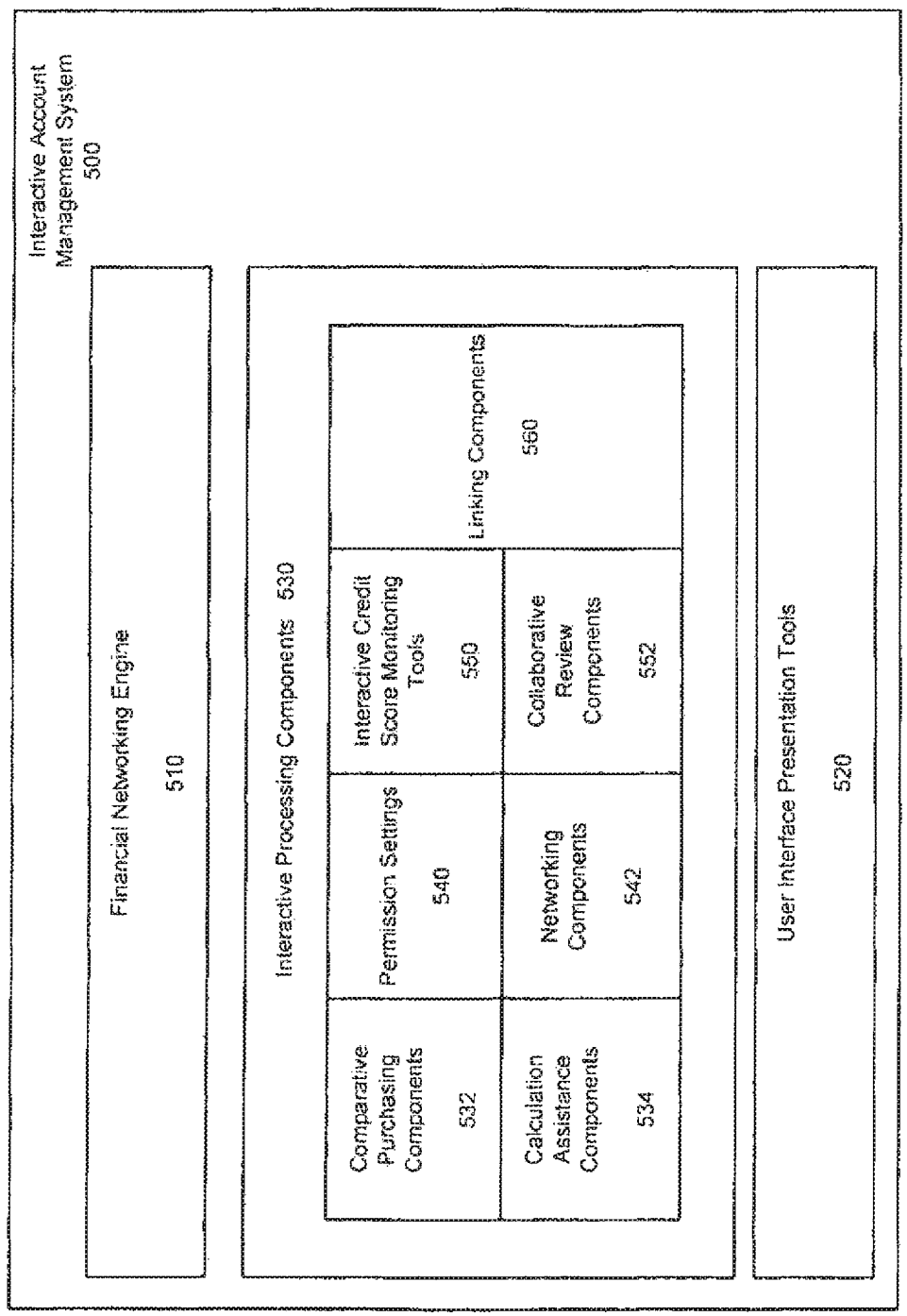
FIG. 5 is a block diagram illustrating an interactive account management system in accordance with an embodiment of the invention.

FIG. 5 is a block diagram illustrating an interactive account management system in accordance with an embodiment of the invention. Components including a financial networking engine 510, interactive processing components 530, and user interface presentation tools 520 may interact with one another to provide interactive interfaces for participants in financial networks.

The financial networking engine 510 may operate to determine members of a financial network and establish relationships based on stored data and input data. The members of a financial network typically include co-account holders, but may also include invited account holders and financial advisors. The financial advisors may be human financial advisors interacting with the account holders and other financial network members, or may alternatively be computerized financial advising programs immediately responsive to the needs of account holders.

The interactive processing components 530 may include comparative purchasing components 532, calculation assistance components 534, permission settings 540, networking components 542, interactive credit score monitoring tools 550, collaborative review components 552, and linking components 560. Each of these components provides content for an interactive interface for members of financial networks as defined by the financial networking engine 500. Representative user interfaces containing the content are illustrated in FIGS. 7-12 and are further described in detail below. Collectively, these interactive processing components 530 help financial network members to achieve financial goals and make intelligent financial decisions.

Although the aforementioned components are shown as discrete modules, each of the modules may alternatively be integrated with one another. If the modules are discrete, multiple modules may operate cooperatively as will be further explained below.

Figure 6:
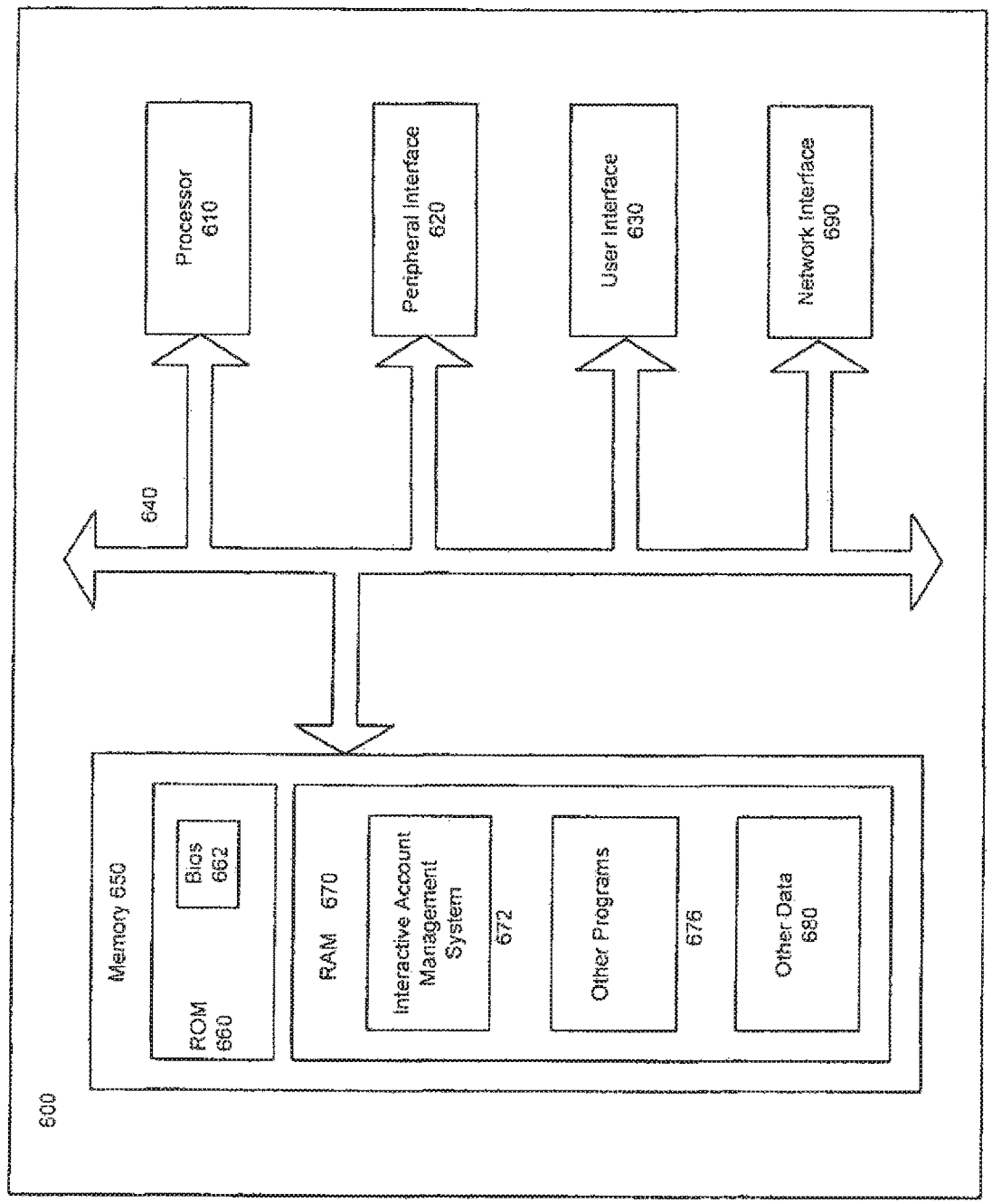
FIG. 6 is a block diagram illustrating a computing system implementing an interactive account management system in accordance with an embodiment of the invention.

FIG. 6 is a block diagram illustrating a computing system 600 implementing an interactive account management system in accordance with an embodiment of the invention. The components shown in FIGS. 1-5 above may be or include a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The computer system 600 may include a general purpose computing device in the form of a computer including a processing unit 610, a system memory 650, and a system bus 640 that couples various system components including the system memory 650 to the processing unit 610.

Computers typically include a variety of computer readable media that can form part of the system memory 650 and be read by the processing unit 610. By way of example, and not limitation, computer readable media may comprise computer storage media and communication media. The system memory 650 may include computer storage media in the form of volatile and/or nonvolatile memory such as read only memory (ROM) 660 and random access memory (RAM) 670. A basic input/output system (BIOS) 662, containing the basic routines that help to transfer information between elements, such as during start-up, is typically stored in ROM 660. RAM 670 typically contains data and/or program modules that are immediately accessible to and/or presently being operated on by processing unit. The data or program modules may include the illustrated interactive account management system 672, an operating system, application programs, other program modules 676, and program data 680. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™ operating system, the Apache™ operating system, an OpenStep™ operating system or another operating system of platform.

At a minimum, the memory 650 includes at least one set of instructions that is either permanently or temporarily stored. The processor 610 executes the instructions that are stored in order to process data. The set of instructions may include various instructions that perform a particular task or tasks, such as those shown in the appended flowchart of FIG. 14. Such a set of instructions for performing a particular task may be characterized as a program, software program, software, engine, module, component, mechanism, or tool. The interactive account management system 500 as shown in FIG. 5, may include a plurality of software processing modules stored in a memory as described above and executed on one or more processors in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 610 that executes commands and instructions may be or be located within a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface 630 that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit 610 through a user input interface that is coupled to the system bus 640, but may be connected by other interface and bus structures, such as a parallel port, game port or a universal serial bus (USB).

One or more monitors or display devices may also be connected to the system bus via an interface 620. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter 690. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP. UDP, or OSI for example. For wireless communications, communications protocols may include Bluetooth, Zigbee, IrDa or other suitable protocol.

Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Figure 7:
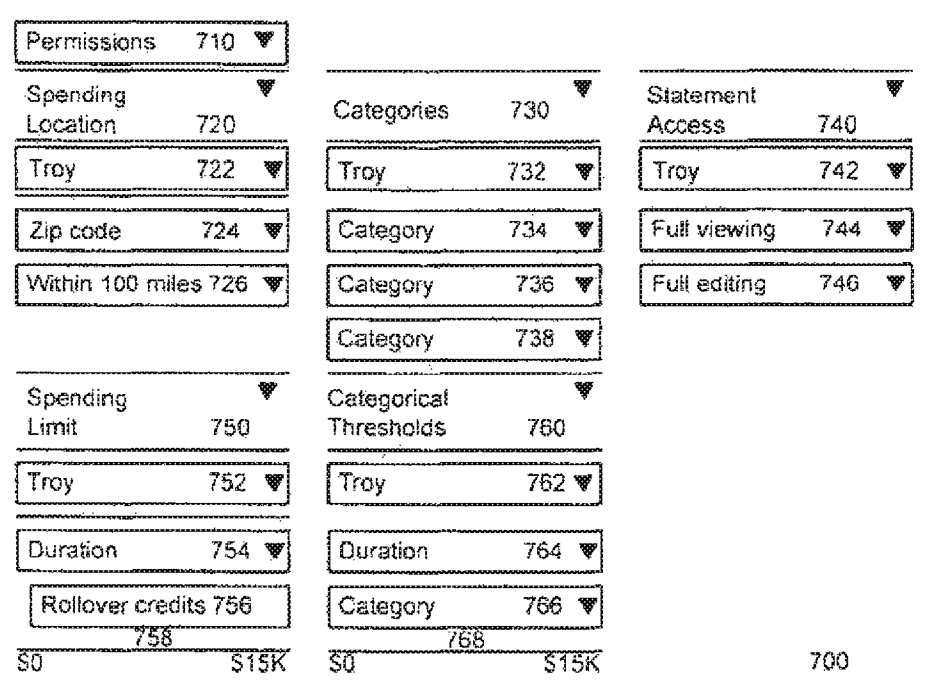

FIG. 7 illustrates a user interface 700 displaying permission settings. Content for the permissions setting user interface 700 may be provided by permission setting components 540 of FIG. 5 to an account holder in accordance with an embodiment of the invention. Permission settings are particularly useful in a financial network such as that shown in FIG. 2 in which a main account holder authorizes multiple other account holders to perform various actions or view various account features. Such arrangements are common, for example, in families and in small businesses.

The permissions user interface 700 is a centralized graphical interface for managing multiple users. The permission interface provides a group of interactive information elements which users can set up to incorporate relevant data streams within the account statements and web pages. The data streams can range from RSS (Really Simple Syndication) feeds for financial news to other account data for small businesses, to purchase requisition queues needing review and approval.

As illustrated, permissions 710 may be accessed by a drop down menu and further menus may be provided for regulating spending locations 720, categories 730, statement access 740, spending limits 750, and categorical thresholds 760.

The spending locations 720 may be determined for a particular account holder at 722 and for a location as defined by zip code 724 and radius 726. Furthermore, the spending categories 730 may also be defined for a particular individual at 732. Multiple category menus 734, 736, and 738 may be provided. Categories may for example include dining, entertainment, home improvement, apparel, etc. In embodiments of the invention, a receipt collector, such as that disclosed in co-pending patent application Ser. No. 11/952,457 filed on Dec. 7, 2007 may be implemented to keep track of category spending.

Regulation of statement access 740 may be performed for each individual at 742. For example, statement access may provide full viewing, various partial viewing modes, or no viewing available at 744. Statement access may further involve full editing, various forms of partial editing, or no editing privileges at 746.

The spending limit 750 may be set for various individuals at 752. The limit may apply for a particular duration 754. Rollover credits may be applied at 756 to increase a spending limit for a payment cycle. A spending range is shown at 758.

Categorical thresholds 760 may apply a combination of factors to limit spending in particular categories. The spending may be limited for a particular individual at 762 for a specific duration 764 in a particular category 766. A threshold range may be shown at 768.

Thus, the permission user interface 700 provides a centralized forum for account holder interactions and simplifies set up for a primary account holder. For the financial institution, the permission user interface 700 reduces call center calls and helps to solidify family and business account position. Overall, the permission user interface 700 allows a main or primary account holder or other individual to control the account experience for other account holders.

Figure 8:
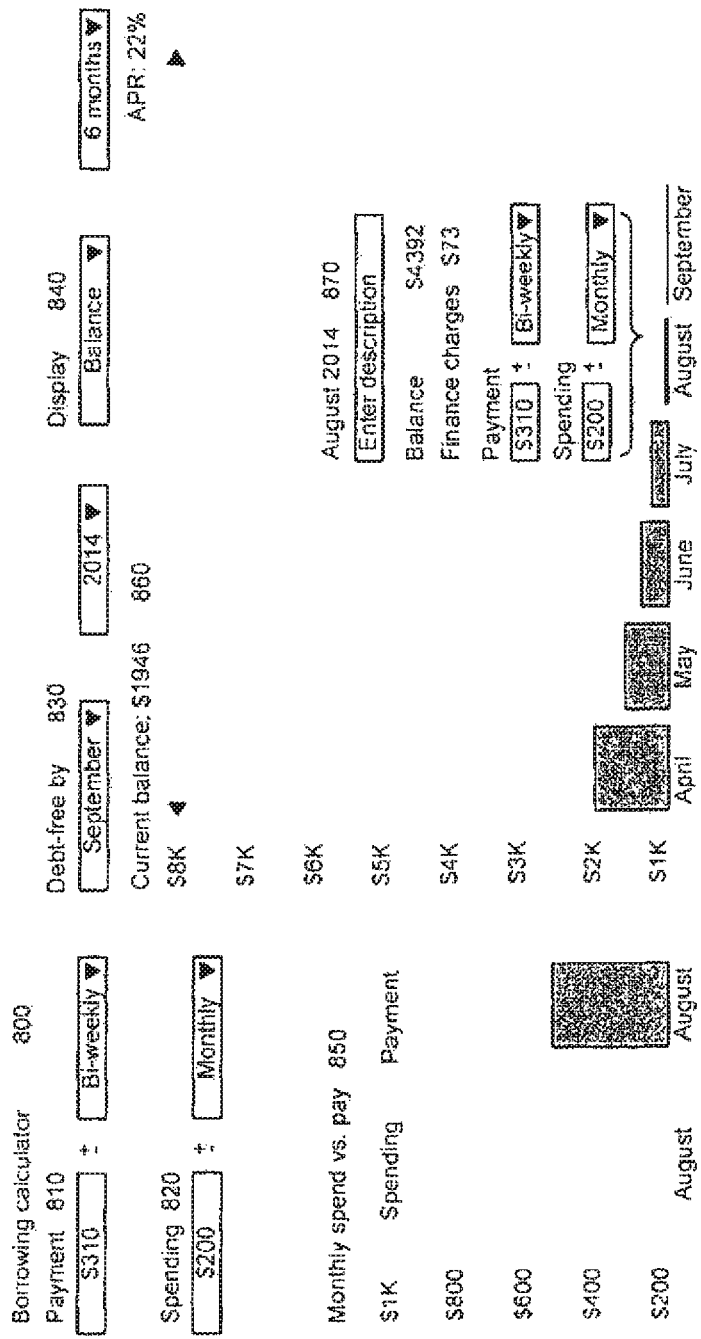
FIG. 8 illustrates a user interface providing account holder calculation assistance in accordance with an embodiment of the invention.

FIG. 8 illustrates a borrowing calculator user interface 800 providing account holder calculation assistance in accordance with an embodiment of the invention. The content of the borrowing calculator user interface 800 may be formulated by the calculation assistance components 544 of FIG. 5. The borrowing calculator interface 800 may be a real-time dynamic and graphical payment tool that enables better payment decisions, card use and borrowing. The borrowing calculator interface 800 allows user to envision the intangible and compare scenarios for paying down balances. The borrowing calculator interface 800 simplifies payment for individual purchasers.

In FIG. 8, the borrowing calculator interface 800 shows a particular scenario involving a payment amount and frequency 810 and spending amount and frequency 820. These items are selectable from multiple options in accordance with embodiments of the invention. A graph 850 visually illustrates spending and payment for a selected time period. Additionally, loan balance and progress in paying off the loan may be illustrated with chart 860. The interface 800 may further provide an indication at 830 of when the debt will be paid, given a specific payment plan. Furthermore, a snapshot into the loan at a particular point in time may be provided by selectable items 840 and 870. Thus, the borrowing calculator interface 800 can function as an automated financial advisor with respect to a given loan.

For the account holder, the borrowing calculator interface 800 provides increased confidence and control. For the financial institution, the borrowing calculator interface 800 provides assurances that paying down large balances is understood by account holders. The transparency of the borrowing calculator instills trust and thus fosters customer loyalty. The borrowing calculator functionality also gives context specific opportunities to present lending products.

Figure 9:
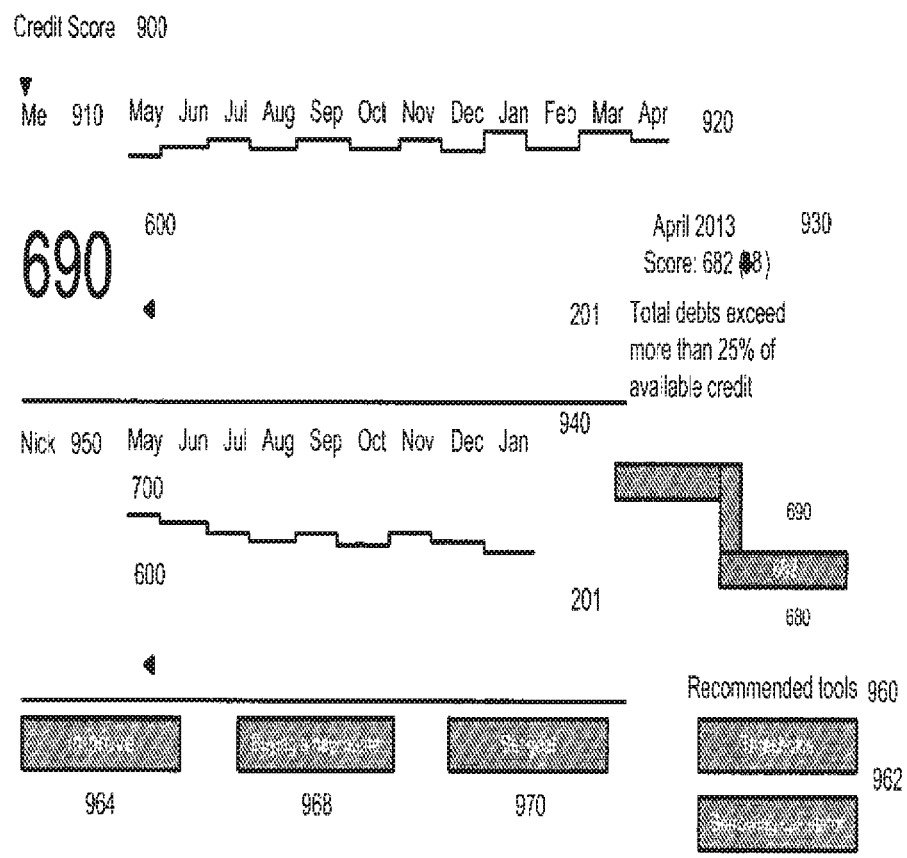
FIG. 9 illustrates a user interface for evaluating and improving credit scores in accordance with an embodiment of the invention.

FIG. 9 illustrates a credit score user interface 900 for evaluating and improving credit scores in accordance with an embodiment of the invention. The content of the credit score user interface 900 may be provided by the interactive credit score monitoring tools 550 of FIG. 5. The credit score user interface 900 provides a credit score visualizer for allowing account holders to view their scores and recommendations to improve their scores. The credit score visualizer interface 900 aims to demystify credit scores, such as FICO scores. Account holders wanting to purchase a home will be able to manage their credit score and optimize their interest rates.

The credit score user interface 900 may include credit scores for multiple account holders 910 and 950 and these account holders may view the credit score visualizer user interface 900 from their own respective computing system. In embodiments of the invention, the credit score user interface 900 will highlight the information relevant to a particular viewer, but may additionally display information relevant to all account holders of a given account or other members of a financial network holding different accounts. Graphs 920 and 940 may be shown for account holder's credit scores over time. Additional information 930 may provide an explanation for the credit score. Selectable options such as an improve option 964, a home buying option 968, and a goal setting option 970 may also be provided. A recommended tools option 960 may switch between thresholds and the borrowing calculator options 962.

The credit score visualizer interface 900 provides a tool for facilitating viewing and understanding of credit scores. The credit score visualizer interface 900 allows account holders to understand the link between behavior and score.

In embodiments of the invention, the credit score visualizer interface 900 incorporates goals and advice from the financial institution. For account holders, the credit score visualizer interface helps predict implications of future behavior and helps users set goals. The credit score visualizer interface 900 further marks progress and enables account holders to remain aware of progress. Thus, the account holders become more involved and are more easily able to plan, giving account holders confidence and improving their situation. For the financial institution, providing the credit score visualizer interface 900 assists its account holders with financial health and discourages irresponsible borrowing and bad debt. Furthermore, the transparency instills trust and fosters customer loyalty.

FIG. 10 illustrates a financial networking feature 1000 in accordance with an embodiment of the invention. This financial networking feature 1000 may be formulated by the networking components 542. Financial networking feature 1000 displays a menu 1010, addressee 1020, subject 1030, and email message 1040. The email message 1040 offers a signup opportunity 1050 to the addressee.

The financial networking feature 1000 promotes comingling information and sharing. The displayed financial networking message is an invitation from Nora to her husband Nick. If he accepts the invitation, he will become part of Nora's financial network and thus will be able to share with her other features disclosed herein, such as the FICO score user interface described above.

The financial networking feature 1000 thus functions as a request for others to join an account holder's financial network. In embodiments of the invention, the financial networking feature is a system that allows account holders to invite and accept connection invitations from other account holders at the same financial institution.

For the accountholders, the financial networking feature 1000 allows them to quickly merge finances (e.g. couples and small business partners). The financial networking feature 1000 provides a tool for encouraging parties to be jointly invested in financial goals and assists with navigation of relationships.

For the financial institution, the financial networking feature 1000 provides a tool for making connections to new and existing account holders. It further provides a window into how and why account holders interact with one another and provides opportunities to facilitate other peer-to peer transactions.

Figure 11:
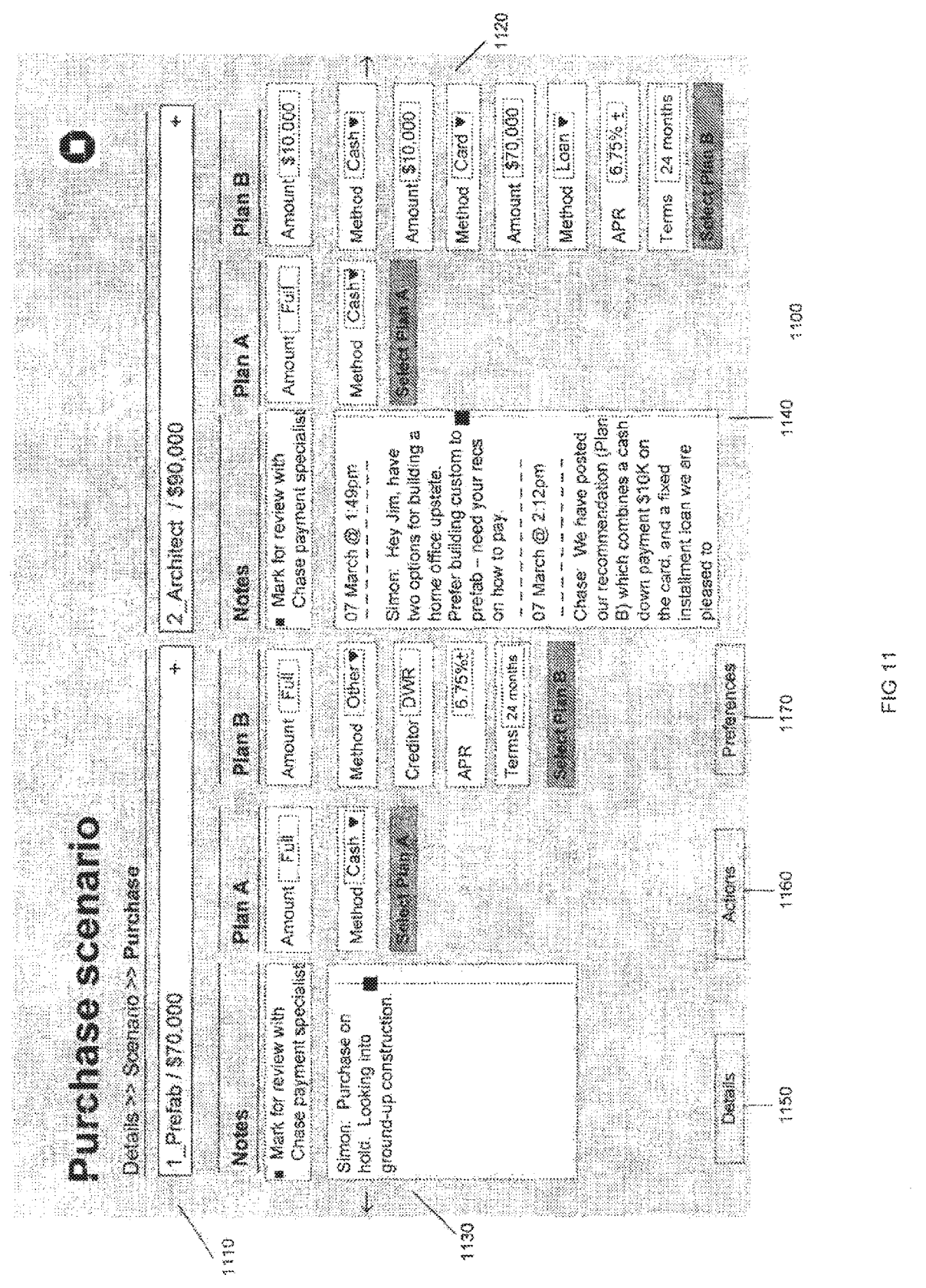

FIG. 11 illustrates a comparative purchasing scenario interface 1100 in accordance with an embodiment of the invention. The content of the purchase scenario interface 1100 may be produced by the comparative purchasing components 532. The purchase scenario interface 1100 provides a tool for generating conversation around payment options. The purchase scenario interface 1100 provides an interactive tool for users to consider large purchases, financing options, and payment scenarios.

The purchase scenario interface 1100 may include options such as a prefab scenario 1110 and an architect scenario 1120. The plans and notes may be provided as shown at 1130 and 1140. Selectable details, actions, and preferences may also be provided. Furthermore, by selecting a particular plan, an account holder may be able to focus upon and further develop the selected plan.

The purchase scenario interface 1100 allows for interactions with third parties and business parties and centralizes all discussion around scenario planning in one place. The purchase scenario interface 1100 further gives account holders confidence that they are selecting the most appropriate option. For the account holder, the purchase scenario feature 1100 improves confidence and financial situation and helps to navigate relationships and maximize available time. For the financial institution, the purchase scenario interface 1100 provides the opportunity to highlight types of purchases that interest people. The financial institution thus has the ability to point to tailored lending products. The purchase scenario interface 1100 may be viewed by multiple members of a financial network and may also benefit from input from a financial advisor member of the financial network.

Figure 12:
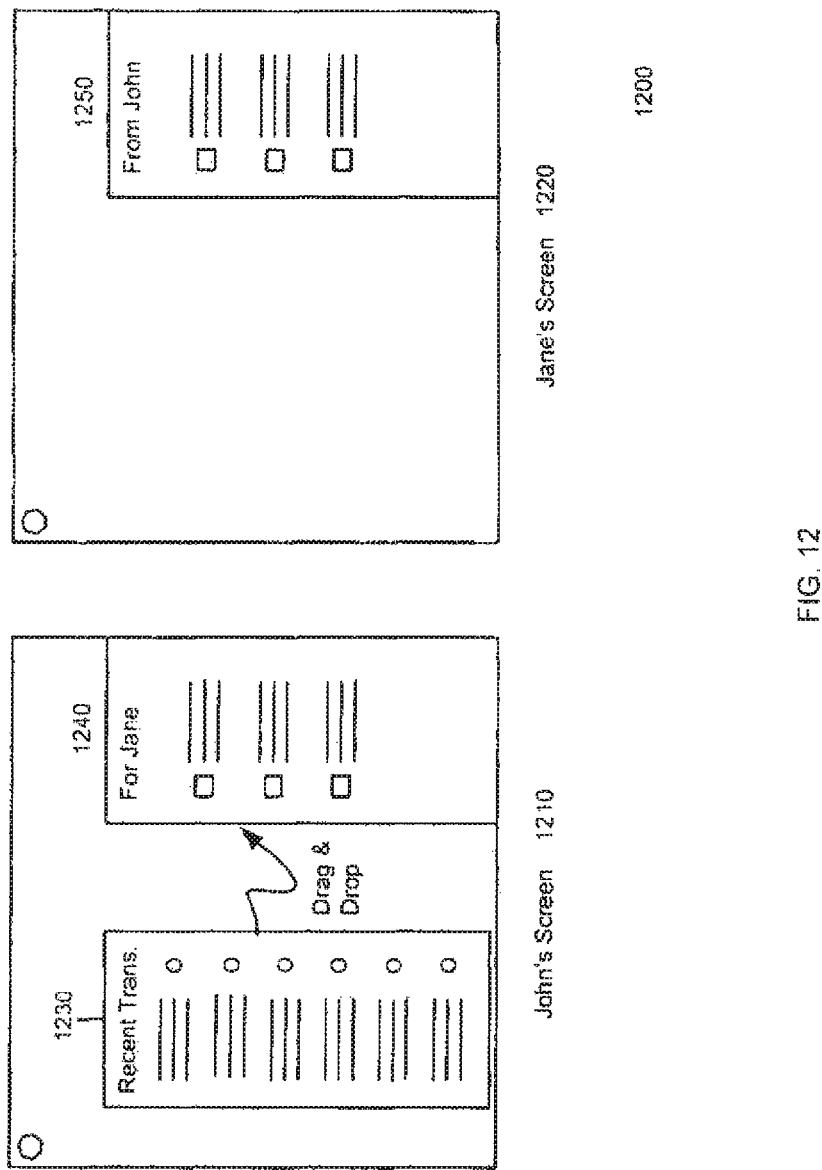
FIG. 12 illustrates user interfaces for collaborative review in accordance with an embodiment of the invention.

FIG. 12 illustrates collaborative review user interfaces 1200 for use by multiple financial network members in accordance with an embodiment of the invention. The content of these user interfaces 1200 may be controlled by the collaborative review components 552 of FIG. 5.

The collaborative review interfaces 1200 may include distinct interactive screens for members of a financial network. John's screen 1210 shows John's financial information including recent transactions 1230 as well as information relevant to Jane 1240 that is transmitted from Jane or to Jane. Jane's screen 1220, likewise shows information 1250 from John.

The collaborative review interface 1200 may include review pen functionality that provides a conversation tool to allow discussion of accounts with other users and with the financial institution. The review pen offers the opportunity to highlight transactions for family members and business partners to review and act upon. The review pen may further allow annotation of transactions.

The collaborative review interface 1200 benefits account holders because it allows visibility and interaction for compartmentalized couples. It further allows for interactions with third parties and business parties. The collaborative review interface 1200 highlights types of transactions of greatest interest to account holders. For example, the collaborative review interface 1200 may highlight transactions involving greater than $400. Furthermore, the collaborative review interface 1200 functionality can point to the ability to add specialized offers (e.g, fraud, review, dispute resolution, specialized lending products).

FIG. 13 illustrates a relationship link user interface 1300 in accordance with an embodiment of the invention. The content of the relationship link user interface 1300 may be created by the linking components 560 of FIG. 5. The relationship link user interface 1300 may provide an interactive way to establish connection with other eligible financial network members, such as family members, financial advisors, or other financial institutions. Account holders can choose to selectively share one or more portions of their statement experience.

As illustrated, a credit score section 1310 may provide credit scores for the account holder 1312 and for a network member 1314. Information on how to obtain improvement of credit scores may be obtained by selection of improve option 1316. A goals section 1320 may display selected goals such as a new house 1322 or a trip to Thailand 1324. Goals may be added by selecting the add option 1326. A financial network section 1330 may include a drop down menu 1332 for selection of members as well as displayed icons 1334 of financial network members who may include for example, family members and financial advisors.

The relationship link functionality allows for seamless sharing of information and provides a common window into multiple relationships. Furthermore, for the financial institution, the relationship link provides a technique to acquire new relationships based on existing account holders and allows for value-added integration across a lines of business.

Figure 14:
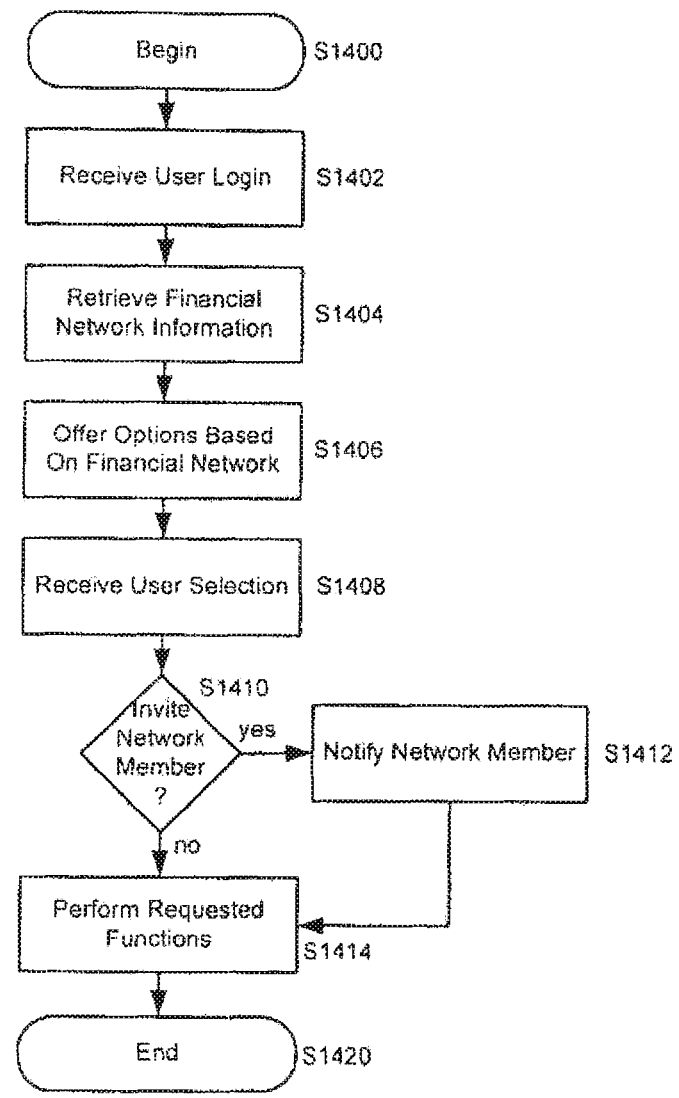
FIG. 14 is a flowchart illustrating a method for providing an interactive account interface in accordance with an embodiment of the invention.

FIG. 14 is a flowchart illustrating a method for providing an interactive account interface in accordance with an embodiment of the invention. The method begins in S1400. The interactive account relationship management system receives a user login in S1402. In S1404, through the financial networking engine, the system retrieves financial network information stored for the logged in account holder. In S1406, the system provides an interface built based upon the user's financial network. In S1408, the system receives a selection. If the selection invites participation from another network member in S1410, the network member is notified in S1412. If the system does not require an invitation, the requested function is performed in S1414 and the method ends in S1420.

Of course other methods may also be performed with the system of the invention in accordance with all of the functionality described herein. Thus, embodiments of the invention relate to a method and system for providing interactive financial guidance that enable an account holder to interact with co-account holders or family members, a credit card issuing company, a financial advisor, or other relevant entities to make financial decisions and share financial information. The method and system have particular application for financial accounts, such as credit card accounts, mortgage accounts, checking accounts, and other types of financial accounts While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. An interactive account management system operated by a financial institution for an account holder at the financial institution, the system comprising:
   a computer memory storing instructions;
   a user device having a user interface including an input device;
   a first database for storing financial account information associated with the account holder, the database being accessible by the user device and addressable over a public communication network, wherein the account holder information comprises information input by the account holder relating to at least one financing plan;
   a computer processor coupled to the computer memory, operable to execute the stored instructions to
      receive login information from the account holder transmitted by the user device over the public communication network;
      access, over a private communication network, the account holder information stored in the first database;
      access, over the private communication network, account settings and rules associated with the account holder information stored in a second database;
      generate a plurality of payment options associated with the at least one financing plan, the plurality of payment options being based on information acquired by the processor relating to the account holder, including the account holder information input by the account holder, and account holder information acquired over the public communication network from other financial institution systems, credit reporting agency systems, and merchant systems;
      receive a recommendation, over the public communication network, from a user account associated with the financial institution, the recommendation relating to the at least one payment option of the plurality of payment options, wherein the recommendation is based on information acquired by the processor relating to the account holder, including a credit score of the account holder and recommendations on ways for the account holder to improve the credit score; and
      interactively display, on the user device, a graphical user interface using drop-down menus that include
         permission settings that upon activation designate other users with authorization to perform selected actions in the system,
         a real-time dynamic and graphical tool that upon activation compares various scenarios relating to a plurality of payment options projected over user-selected time periods, including a graphing module that provides an automated visual progress display of the various scenarios over the user-selected time periods, and
         an interactive credit score simulator that upon activation simulates the changing of a credit score projected over a user-designated time period based on simulated user-selectable behavior, including a graphical visualizer that provides a simulated visual progress display of the simulated user-selectable behavior over the user-designated time period.

2. The system of claim 1, further comprising:
an interactive messaging component to allow direct communication between the account holder and the user account associated with the financial institution, the direct communication being viewable on the user interface.

3. The system of claim 1, further comprising:
a selectable option for displaying additional details associated with at least one of the two or more payment options on the user interface.

4. The system of claim 1, further comprising:
a selectable option for displaying options for actions associated with at least one of the two or more payment options on the user interface.

5. The system of claim 1,
wherein the account holder information further comprises information input by the account holder relating to account holder preferences.

6. The system of claim 5 further comprising:
a selectable option for displaying additional preference options associated with at least one of the two or more payment options on the user interface.

7. The system of claim 1, further comprising:
multiple financing plans displaying simultaneously on the user interface.

8. The system of claim 7,
wherein each of the multiple financing plans relates to a single purchasing scenario.

9. The system of claim 1, wherein at least one of the two or more payment options includes a promotion for a tailored lending product offered by the financing plans.

10. The system of claim 1, wherein the user interface further comprises a modifiable text box for inputting notes in relation to each of the at least one financing plans.

* * * * *